United States Patent [19]

Britt

[11] Patent Number: 4,606,367

[45] Date of Patent: Aug. 19, 1986

[54] APPARATUS AND METHOD FOR RELIEVING PRESSURE WITHIN A HIGH PRESSURE TANK

[76] Inventor: Franklin J. Britt, 3744 Hartland Rd., Gasport, N.Y. 14067

[21] Appl. No.: 719,690

[22] Filed: Apr. 4, 1985

[51] Int. Cl.$^4$ .................... F16K 17/40; F16K 24/00; F17C 13/12

[52] U.S. Cl. ..................... 137/15; 137/68.1; 137/329.3; 137/901; 222/3; 222/397; 222/501

[58] Field of Search ............. 137/15, 68 R, 70, 329.1, 137/329.2, 329.3, 522, 614.2, DIG. 2, 901; 222/3, 396, 397, 501, 545

[56] References Cited

U.S. PATENT DOCUMENTS

| 2,945,503 | 7/1960 | Atkinson | 137/68 R |
|---|---|---|---|
| 3,618,626 | 11/1971 | Russo | 137/68 R |
| 3,645,286 | 2/1972 | Follett | 137/68 R |
| 3,648,893 | 3/1972 | Whiting | 137/68 R |
| 4,077,422 | 3/1978 | Brinkley et al. | 137/68 R |

FOREIGN PATENT DOCUMENTS

| 453571 | 12/1948 | Canada | 137/329.3 |
| 84089 | 12/1957 | Denmark | 137/329.3 |

Primary Examiner—George L. Walton
Attorney, Agent, or Firm—Christel, Bean & Linihan

[57] ABSTRACT

An apparatus and associated method for relieving the pressure within a high pressure tank having an opening plugged by a broken safety valve of a special type utilizes a mechanism acting between the annular flange of the tank normally provided for the securement of a valve protector cap and the valve to permit pressurized contents confined within the tank to escape through the valve. The special valve includes a flow passage in axial alignment with the tank opening in which the valve portion is received and defines a ball chamber in which a spherical ball is seated. The apparatus of the invention includes a stem which is movable through the valve portion flow passage for engagement with the spherical ball to thereby unseat the ball and open the valve flow passage. By unseating the ball, contents of the tank pass out of the valve flow passage and are directed either into the atmosphere or another vessel for reclaiming purposes. The method of the invention includes the steps of utilizing the apparatus of the invention.

15 Claims, 2 Drawing Figures

APPARATUS AND METHOD FOR RELIEVING PRESSURE WITHIN A HIGH PRESSURE TANK

BACKGROUND OF THE INVENTION

This invention relates, in general, to a high pressure tanks and safety valves therefor and relates, more particularly, to a high pressure tank containing contents under pressure and which is which is plugged by a broken safety valve of a special type.

The type of high pressure tank with which this invention is concerned defines a circular throat opening adapted to sealingly receive a portion of a safety and/or service valve through which the tank is emptied and filled and includes an externally-threaded annular flange positioned about the circular opening of the tank and normally provided for the attachment of a valve-protector cap. Such containers are commonly in the form of thick-walled cylinders and the aforesaid annular flange is commonly an integral extension of the tank cylinder. An example of a tank of the aforedescribed type is shown and described in U.S. Pat. No. 4,077,422.

The type of safety valve with which this invention is concerned includes a body having a sealing portion for closing the circular opening in a tank and an external portion defining a valve outlet port. The sealing portion defines an inlet port positionable internally of the tank, and a flow passage extends between the valve inlet and outlet ports. Defined within the portion of the flow passage positioned internally of the tank is a ball chamber having an inlet end and an outlet end, and a spherical ball is loosely received by the ball chamber and adapted to be biased into sealingly engagement with the outlet end thereof when the fluid pressure at the ball chamber inlet end is higher than that at the ball chamber outlet end. The valve further includes means associated with the external portion of the valve body for preventing the ball from engaging the ball chamber outlet end until the external portion is separated from the sealing portion. If the external portion of the valve is broken away from the sealing portion, the pressure of the tank contents seats the ball in the ball chamber outlet end and thereby prevents the escape of the tank contents. Such a valve is shown and described in pending application Ser. No. 642,201, now U.S. Pat. No. 4,562,852, entitled SAFETY VALVE and having the same inventor as the present invention.

Because a valve such as is described in the referenced pending application is known to prevent the sudden escape of contents of a high pressure tank if the external portion of the valve away from the valve sealing portion, the valve is desirable for safety considerations. If, for example, the external portion of the valve is broken off, the valve ball and associated chamber prevent the tank from becoming a dangerous and destructive projectile. However, before the high pressure tank is rendered operational or can be returned to service, the pressure in the tank must be relieved and the valve sealing portion removed. Therefore, there exists a need for means by which the pressure within such a high pressure tank can be relieved.

It is, accordingly, an object of the present invention to provide an apparatus and method for relieving the pressure within a high pressure tank plugged by a portion of a broken safety valve of the aforedescribed type.

Another object of the present invention is to provide such an apparatus and method wherein the contents of the high pressure tank can be salvaged or reclaimed.

Still another object of the present invention is to provide such an apparatus which is uncomplicated in structure and economical to manufacture.

Yet still another object of the present invention is to provide such an apparatus which is safe and dependable in operation and easy to use.

SUMMARY OF THE INVENTION

This invention resides in an apparatus and associated method for relieving the pressure within a high pressure tank of the type having a circular throat opening and an externally-threaded annular flange surrounding the tank opening and wherein the tank opening is plugged by a portion of a broken safety valve. The broken safety valve portion includes a spherical ball and a flow passage defining an outlet opening externally of the tank and an inlet opening into the tank interior. The flow passage extends generally along the central axis of the tank opening and has a ball chamber in which the spherical ball is received. The ball chamber has an outlet end aligned with the central axis of the circular tank opening and sealingly accepts the ball so that pressurized contents within the tank are prevented from escaping the valve portion flow passage. The apparatus of the invention includes means for acting between the tank and the spherical ball of the safety valve portion to unseat the ball from the ball chamber outlet end and thereby permit the pressurized contents of the tank to escape through the outlet of the valve portion flow passage.

In one embodiment of the apparatus, the means for acting includes securement means in the form of a cup-shaped member having an internally-threaded lip adapted to be threadably accepted by the externally-threaded flange of the tank and stem means rotatably attached to the cup-shaped member for extending into the valve portion flow passage to move the ball relative to the ball chamber outlet end as the stem means is rotated relative to the cup-shaped member. The cup-shaped member includes a wall defining at least one through-aperture through which tank contents which are permitted to escape through the valve portion flow passage by the apparatus can pass and a central opening, which, when the cup-shaped member is threadably accepted by the tank flange, is generally aligned with the central axis of the tank opening. The stem means includes a portion mounted within the aforesaid central opening for movement along a linear path to unseat the ball as the stem means are rotated relative to the cup shaped member.

The method of the present invention includes the steps involved in utilizing the apparatus of this invention. Initially, an apparatus of this invention is provided, and the stem means thereof are positioned in relationship to the securement means thereof so that when the securement means are operatively secured to the annular flange of the tank, the stem means are spaced from the spherical ball in the ball chamber outlet end. The securement means are then secured about the annular flange of the tank, and the stem means are then moved relative to the securement means to move the stem means through the valve portion flow passage and thereby unseat the ball.

DETAILED DESCRIPTION OF THE ILLUSTRATIVE EMBODIMENTS

Figure 1:
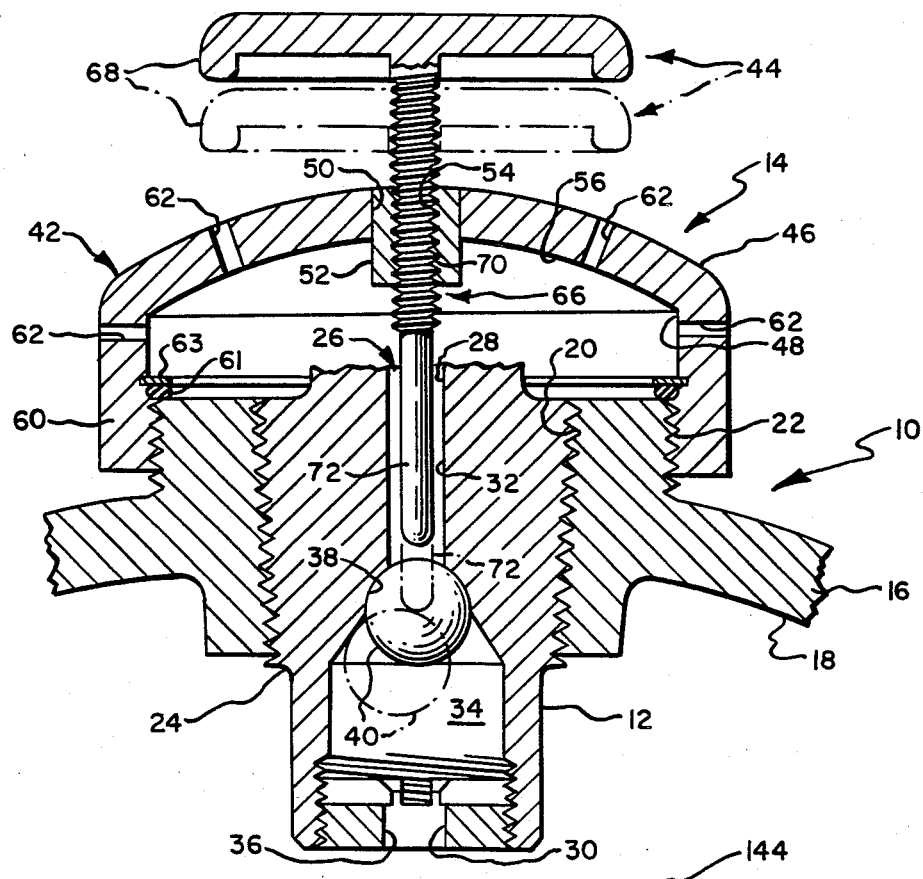
FIG. 1 is a longitudinal cross-sectional view of an embodiment of an apparatus in accordance with the present invention shown operatively positioned upon a plugged high pressure tank.

Turning now to the drawings in greater detail and considering first FIG. 1, there is shown a tank 10 filled with contents under pressure, a broken portion of a combination safety and service valve 12 and a pressure relief apparatus, generally indicated 14, constructed in accordance with the apparatus of the present invention. The tank 10 is of the type used to store fluids, such as gas for welding, at high pressure and includes an outer metallic hollow shell 16 having an interior wall 18 which surrounds the tank interior. Access to the tank interior is provided by a single internally-threaded circular throat opening 20 defined by the tank shell 16. The shell 16 also includes an externally-threaded section or flange 22 encompassing the tank opening 20. The flange 22 is adapted to threadably accept a removable valve-protector cap (not shown) for protecting the valve 12 during transportation of the tank 10. The flange 22 is so arranged in relationship with the tank opening 20 that its central or vertical, axis is generally aligned with the central, or vertical, axis of the opening 20.

The safety and service valve 12 includes a body having a sealing portion 24 which is threadably received by and closes the throat of the tank opening 20. The valve body can be constructed of any of a number of materials, such as steel or brass, capable of withstanding pressures to which the interior of the high-pressure tank 10 is commonly exposed. The sealing portion 24 defines a flow passage 26 having an outlet 28 opening generally externally of the tank 10 and an inlet 30 opening generally into of the tank interior. The flow passage 26 includes a upper portion bore 32 and a ball chamber 34 aligned with the ball portion 32. The ball chamber 34 includes an inlet end 36 and an outlet end 38 and loosely receives a spherical ball 40. The outlet end 38 is conical in shape for a reason which will be apparent thereafter. The flow passage 26 is so arranged in relationship to the tank opening 20 that the central, or longitudinal, axis of the bore 32 and the ball chamber 34 are generally aligned with one another and the central axis of the tank opening 20.

The ball 40 is biased toward the end of the ball chamber 30 exposed to the lower fluid pressure. During a normal service operation with the valve 12, the ball 40 is prevented from seating in the outlet end 38 of the ball chamber 34 by a mechanical member attached to the external portion (not shown) of the valve body. Thus, when the external portion of the valve 12 is broken off from the remainder of the valve, the pressurized contents of the tank force the ball 40 into sealing relationship, or solid line position, with the chamber outlet end 38. For a more complete description of the valve 12, reference may be had to pending U.S. patent application Ser. No. 642,201, now U.S. Pat. No. 4,562,852, entitled SAFETY VALVE, and having the same inventor as the present invention.

In accordance with the apparatus of the present invention, the pressure relief apparatus 14 includes means for acting between the tank 10 and the spherical ball 40 seated within the valve flow passage 26 for unseating the ball 40 and thereby permitting contents of the tank 10 to escape the outlet 28 of the valve flow passage 26. The means for acting includes securement means, generally indicated 42, secured about the tank opening 20 and ball-engaging means, generally indicated 44, attached to the securement means 42 for movement relative thereto and receivable by the valve flow passage 26 for engaging the ball 40. When the securement means 42 are operatively secured about the tank opening 20, as shown in FIG. 1, the ball-engaging means 44 can be moved relative to the securement means to move and thereby unseat the ball 40.

The securement means 42 includes a cup-shaped member 46 defining a cup-shaped interior surface 48 and a rim portion or lip 60 which is internally-threaded as shown. The cup-shaped member 46 is constructed of a suitable metal, such as steel or brass, and is adapted to be threadably accepted by the threads of the annular flange 22 of the tank 10. Positioned adjacent the threads of the lip 60 and in engagement with the interior wall 48 of the member 46 is an "O" ring 61 and a retaining ring 63. When the member 46 is fully threaded onto the flange 22, the "O" ring 61 is tightly held between the upper edge of the flange 22 and the retaining ring 63 to seal the meshed threads of the lip 60 and flange 22. It will be understood that when the member 46 is secured about the flange 22, its interior surface 48 and the outer surface of the tank 10 bounded by the flange 22 collectively define a substantially enclosed cavity 56.

The cup-shaped member 46 further includes a plurality of through-apertures 62,62 and a central bore 50 extending through the wall of the member 46. An internal-threaded bushing 62 is fixedly attached, as by welding, within the central bore 50 so that its threads define a central opening 54 for the cup-shaped member 46. The bushing 52 is so oriented in relationship to the member 46 that when the member 46 is threadably accepted by the annular flange 22 of the tank 10, its central, or longitudinal, axis is generally aligned with the central, or longitudinal, axis of the valve portion flow passage 26.

The ball-engaging means 44 includes stem means in the form of a stem 66 and a handle 68 attached to the stem 66. Both the stem 66 and handle 68 are constructed of a suitable material such as steel or brass. The stem 66 has two opposite ends, or an upper and lower end as shown, and a threaded section 70 therebetween. The threaded section 70 is threadably received by the threaded bushing 52 so that rotation of the stem 66 relative to the cup-shaped member 46 moves the stem 66 in a lengthwise direction along and relative to the bushing 52. The stem 66 further has a reduced, narrow lower portion 72 which is adapted to be received endwise by the valve flow passage 26. The handle 68 is fixedly attached to the upper end of the stem 66 to provide means by which an operator can manually rotate the stem 66 relative to the cup-shaped member 46. The stem 66 is of such length that when the member 46 is operatively attached about the flange 22, as shown, rotation of the stem 66 relative to the member 46 moves the lower portion 72 of the stem 66 through the valve portion flow passage 26 and the outlet end 38 of the ball chamber 34. More specifically and with reference to FIG. 1, rotation of the stem 66 in one direction relative to the member 46 moves the lower portion 72 of the stem 66 from its solid line condition to its phantom line condition.

To utilize the apparatus 14, the lower portion 72 of the stem 66 is initially positioned in a raised condition in relationship to the member 46 by appropriately rotating the handle 68 relative to the member 46 so that the lower end of the stem 66 is positioned relatively close to the bushing 52. The member 46 is then tightly screwed upon the threaded flange 22 of the tank 10. The handle 68 is then rotated relative to the member 46 to bodily move the stem 66 and, in particular, the lower end of the stem 66 downwardly through the valve flow passage 26 and into the ball chamber 34. It will be understood that as the lower end of the stem 66 moves into the ball chamber 34, the ball 40 is forced from its seated condition, as shown in solid lines, to an unseated condition, as shown in phantom lines. By unseating the ball 40, the pressurized contents of the tank 10 are permitted to flow through the flow passage 26 and into the cavity 56. The apertures 62,62 defined in the member 46, in turn, permit contents of the tank 10 to pass into the atmosphere. It will be understood that by controlling the rotation of the handle 68 relative to the member 46 and thereby controlling the distance that the ball 40 is moved from its seated condition, the rate at which the pressurized contents of the tank are permitted to escape through the valve portion flow passage 26 is controlled.

The method of this invention includes the steps involved in utilizing the apparatus 14 of this invention. Initially, the apparatus 14 is provided and the handle 68 is appropriately rotated relative to the cup-shaped member 46 to move the lower portion 72 of the stem 66 into a raised condition in relationship to the member 46. The member 46 is then tightly screwed upon the flange 22 of the tank 10. The handle 68 of the ball-engaging means 44 is then appropriately rotated relative to the cup-shaped member 46 to move the lower portion 22 of the stem 66 downwardly along the valve portion flow passage 26 and into the ball chamber 34. As the lower portion 72 of the stem 66 enters the ball chamber 34, the spherical ball 40 is unseated from the ball chamber outlet end 38 and the flow passage 26 is thereby opened.

Although the present invention has been described by way of various embodiments, it will be understood that numerous modifications and substitutions may be had to the aforedescribed embodiments without departing from the spirit of the invention.

Figure 2:
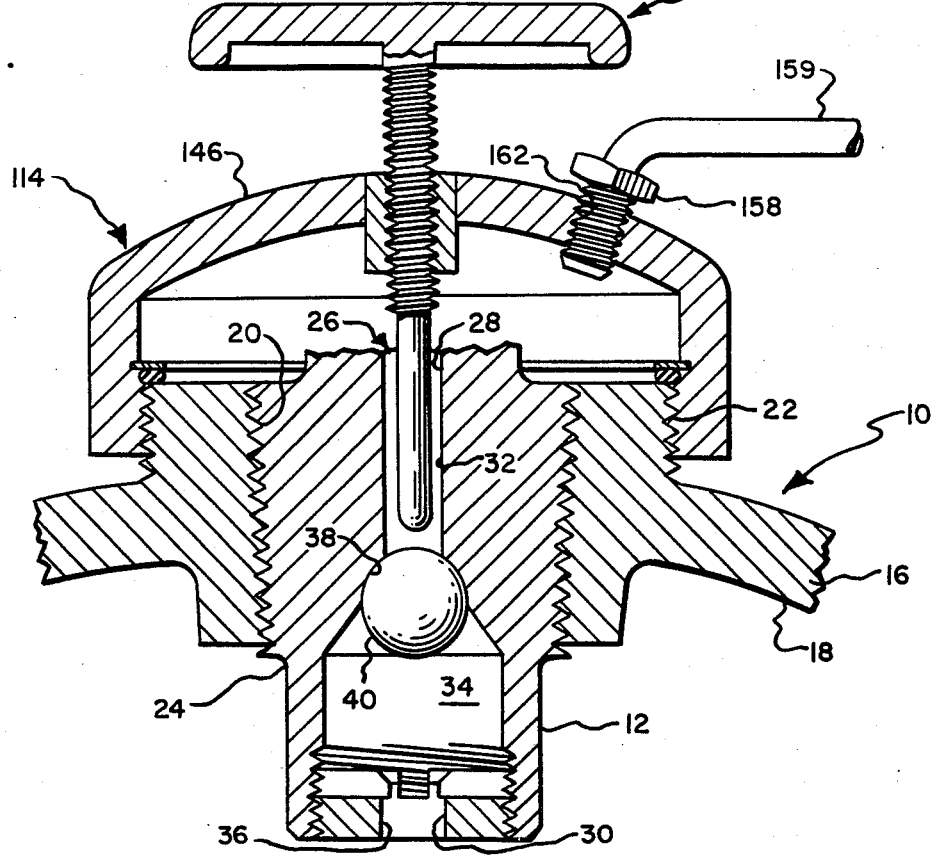
FIG. 2 is a view similar to FIG. 1 illustrating an alternative embodiment of the apparatus in accordance with the present invention.

For example, and with reference to FIG. 2, there is shown an alternative embodiment of an apparatus, generally indicated 114, constructed in accordance with the present invention and shown utilized with the FIG. 1 tank 10 and the FIG. 1 portion of safety valve 12. Components of the tank 10 and valve portion 12 which correspond to components of the FIG. 1 tank 10 and valve 12 are accordingly given the same reference numerals. The apparatus 114 includes securement means in the form of a a cup-shaped member 146 and ball-engaging means, generally indicated 144. The cup-shaped member 146 has a wall defining a single, internally-threaded opening 162 adapted to receive a fitting 158 of a high pressure hose 159. The high pressure hose 159 can be used to direct the released contents of the tank 10 into another tank (not shown) for purposes of salvaging or reclaiming the tank contents. Inasmuch as the FIG. 1 apparatus 14 permits contents of the tank 10 to escape into the atmosphere, the FIG. 2 apparatus 114 permitting the reclaiming of the tank contents is preferred over the FIG. 1 apparatus 14 if the contents of the tank 10 are toxic or explosive and cannot, for safety or environmental considerations, be released into the atmosphere. Accordingly, the aforedescribed embodiments are intended for purposes of illustration and not of limitation.

I claim:

1. A pressure relief apparatus for a high pressure tank containing contents under pressure and having a circular throat opening plugged by a portion of a broken safety valve and an externally-threaded annular flange surrounding the tank opening, the safety valve portion including a spherical ball and a flow passage defining an outlet opening externally of the tank and inlet opening into the tank interior, the flow passage extending generally along the central axis of the tank opening and having a ball chamber in which the spherical ball is received, the ball chamber having an outlet end aligned with said central axis and having a contoured surface positioned within the throat of the tank, said contoured surface sealingly accepting the ball as the ball is biased into sealing engagement with the chamber outlet end by the pressure of the tank contents so that the tank contents are prevented from escaping through the valve portion flow passage, said apparatus comprising:

means for acting between the tank and the spherical ball of the safety valve portion to unseat the ball from the ball chamber outlet end and thereby permit the pressurized contents of the tank to escape through the outlet of the valve portion flow passage, said means for acting including securement means adapted to be secured to said annular flange and ball-engaging means in the form of a stem attached to said securement means for movement relative thereto and for extending into the valve portion flow passage and extending at least beyond said contoured surface to allow the ball to be floatingly received within the ball chamber when the ball is moved out of sealing engagement with said contoured surface for moving the ball relative to the ball chamber outlet end in opposition to the pressure of the tank contents when said stem is moved relative to said securement means.

2. Apparatus as defined in claim 1 wherein said securement means is adapted to be operatively accepted by the threads of said annular flange and defines an interior surface of such shape that when said securement means is operatively accepted by the annular flange, said interior surface and the outer surface of said tank bounded by the annular flange collectively define a substantially enclosed cavity.

3. Apparatus as defined in claim 2 wherein said securement means includes a cup-shaped member having an internally threaded lip adapted to be threadably accepted by the threads of the externally-threaded flange of the tank and said interior surface is provided by the interior cup-shaped surface of said cup-shaped member, said cup-shaped member having a wall defining at least one through-aperture through which tank contents which are permitted by said apparatus to escape through said valve portion flow passage escape said substantially enclosed cavity and defining a central opening which, when said cup-shaped member is operatively accepted by the tank flange, is generally aligned with the central axis of the tank opening, and said stem includes a portion mounted within said central opening for movement along a linear path relative to said cup-shaped member for unseating the ball of the valve portion.

4. Apparatus as defined in claim 3 wherein said central opening is internally-threaded and said stem has two opposite ends and a threaded portion between said two opposite ends, said threaded opening being threadably received by said central portion so that one of said stem ends is positioned substantially within the cup of said cup-shaped member and so that said stem moves in a lengthwise direction relative to said central opening as said stem is rotated therein, said one stem end adapted to be received by the valve portion flow passage and engage the ball positioned therein so that when the cup-shaped member is operatively accepted by the annular flange of the tank, the ball can be moved by said one stem end out of sealing engagement with the ball chamber outlet end by rotating said stem relative to said cup-shaped member.

5. Apparatus as defined in claim 4 wherein said ball-engaging means includes a handle attached to the end of the said stem opposite said one stem end for manually rotating said stem relative to said cup-shaped member.

6. Apparatus as defined in claim 3 wherein said cup-shaped member defines a plurality of through-apertures through which tank contents which are permitted to escape through said valve portion flow passage escape said substantially enclosed cavity.

7. Apparatus as defined in claim 3 wherein there is one through-aperture defined in said wall and said one through-aperture is adapted to accept one end of a conduit through which tank contents which are permitted to escape through said valve portion flow passage can be directed out of said substantially enclosed cavity.

8. Apparatus as defined in claim 2 wherein said central opening is internally threaded, said portion of said stem which is mounted within said central opening is externally-threaded and threadably received by said central opening and said stem includes a reduced portion extending axially of said mounted portion for extending into the valve flow passage and for engagement with said ball.

9. In combination:
  a high pressure tank containing contents under pressure and having a circular throat opening through which the tank is emptied and filled and an externally-threaded annular flange surrounding the tank opening;
  a broken safety valve portion being sealingly received by said tank opening and including a spherical ball and a flow passage, said flow passage defining an outlet opening externally of said tank and an inlet opening into the tank interior, said flow passage extending generally along the central axis of said tank opening and having a ball chamber in which said spherical ball is received, the ball chamber having an outlet end aligned with said central axis and having a contoured surface positioned within the throat of the tank, said contoured surface sealingly accepting said ball as said ball is biased into sealing engagement with said chamber outlet end by the pressure of contents within said tank so that said tank contents are prevented from escaping through said valve portion flow passage; and
  means for acting between said tank and said spherical ball of said safety valve portion to unseat said ball from said ball chamber outlet end and thereby permit said pressurized contents of the tank to escape through said outlet of said valve portion flow passage, said means for acting including securement means adapted to be secured to said annular flange and ball-engaging means in the form of a stem attached to said securement means for movement relative thereto and for extending into the valve portion flow passage and and for extending at least beyond said contoured surface to allow said ball to be floatingly received within said ball chamber when said ball is moved out of sealing engagement with said contoured surface for moving the ball relative to the ball chamber outlet end in opposition to the pressure of said tank contents when said stem is moved relative to said securement means.

10. The combination of claim 9 wherein said securement means is adapted to be threadably accepted by said annular flange
  and defines an interior surface of such shape that when said securement means is operatively accepted by said annular flange, said interior surface and the outer surface of said tank bounded by said annular flange collectively define a substantially enclosed cavity.

11. The combination of claim 10 wherein said securement means includes a cup-shaped member having an internally-threaded lip adapted to be threadably accepted by said threads of said annular flange and said interior surface is provided by the interior cup-shaped surface of said cup-shaped member, said cup-shaped member defining a wall defining at least one through-aperture through which tank contents which are permitted to escape through said valve portion flow passage escape said substantially enclosed cavity and defining a central opening which, when said cup-shaped member is operatively accepted by said tank flange, is generally aligned with the central axis of said tank opening, and said stem includes a portion mounted within said central opening for movement relative to said cup-shaped member for unseating said ball of said valve portion.

12. The combination of claim 10 wherein said central opening is internally-threaded and said stem means includes a stem having two opposite ends and a threaded portion between said two opposite ends, said threaded opening being threadably received by said central portion so that one of said stem ends is positioned substantially within the cup of said cup-shaped member and so that said stem moves in a lengthwise direction relative to said central opening as said stem is rotated therein, said one stem end adapted to be received by the valve portion flow passage and engage the ball positioned therein so that when the cup-shaped member is operatively accepted by the annular flange of the tank, the ball can be moved by said one stem end out of sealing engagement with the ball chamber outlet end by rotating said stem relative to said cup-shaped member.

13. The combination of claim 11 wherein said central opening is internally threaded, said portion of said stem which is mounted within said central opening is externally threaded and threadably received by said central opening and said stem includes a reduced portion extending axially of said mounted portion for extending into the valve flow passage for engagement with said ball.

14. A method for relieving the pressure within a high pressure tank containing contents under pressure and having a circular throat opening plugged by a portion of a broken safety valve and an externally-threaded annular flange surrounding the tank opening, said safety valve portion including a spherical ball and a flow passage defining an outlet opening externally of the tank and an inlet opening into the tank interior, said flow passage extending generally along the central axis of the tank opening and having a ball chamber in which the spherical ball is received, the ball chamber having an outlet end aligned with said central axis and providing a contoured surface positioned within the throat of the tank, said contoured surface sealingly accepting the ball as said ball is biased into sealing engagement with said chamber outlet end of the pressure of the tank contents so that the tank contents are prevented from escaping through said valve portion flow passage, said method comprising the steps of:

providing an apparatus including means for securement to the threads of the annular flange of said tank and associated ball-engaging means, said securement means defining a cup-shaped surface of such shape that when said securement means is operatively accepted by said annular flange, said cup-shaped surface and the outer surface of said tank bounded by said annular flange collectively define a substantially enclosed cavity, said ball-engaging means being attached to said securement means for movement relative thereto and including stem means for extending into the valve portion flow passage and for extending said stem means at least beyond said contoured surface to allow said ball to be floatingly received within said ball chamber when said ball is moved out of sealing engagement with said contoured surface for moving the ball relative to said ball chamber outlet end in opposition to the pressure of the tank contents when said ball-engaging means is moved relative to said securement means;

positioning said stem means in relationship to said securement means so that when said securement means are operatively secured to said annular flange, said stem means are spaced from said spherical ball in said ball chamber outlet end;

securing said securement means about the threads of said annular flange of the tank; and moving said ball-engaging means relative to said securement means to thereby move said stem means through said flow passage and into said ball chamber and thereby unseat said ball.

15. A method as defined in claim 14 wherein said stem means includes a portion mounted within said securement means for rotational movement relative thereto and for movement of said stem means along a linear path relative thereto as said stem means is rotated relative to said securement means and wherein said step of moving includes a step of:

rotating said stem means relative to said securement means to unseat said ball.

* * * * *